United States Patent Office 3,407,668
Patented Oct. 29, 1968

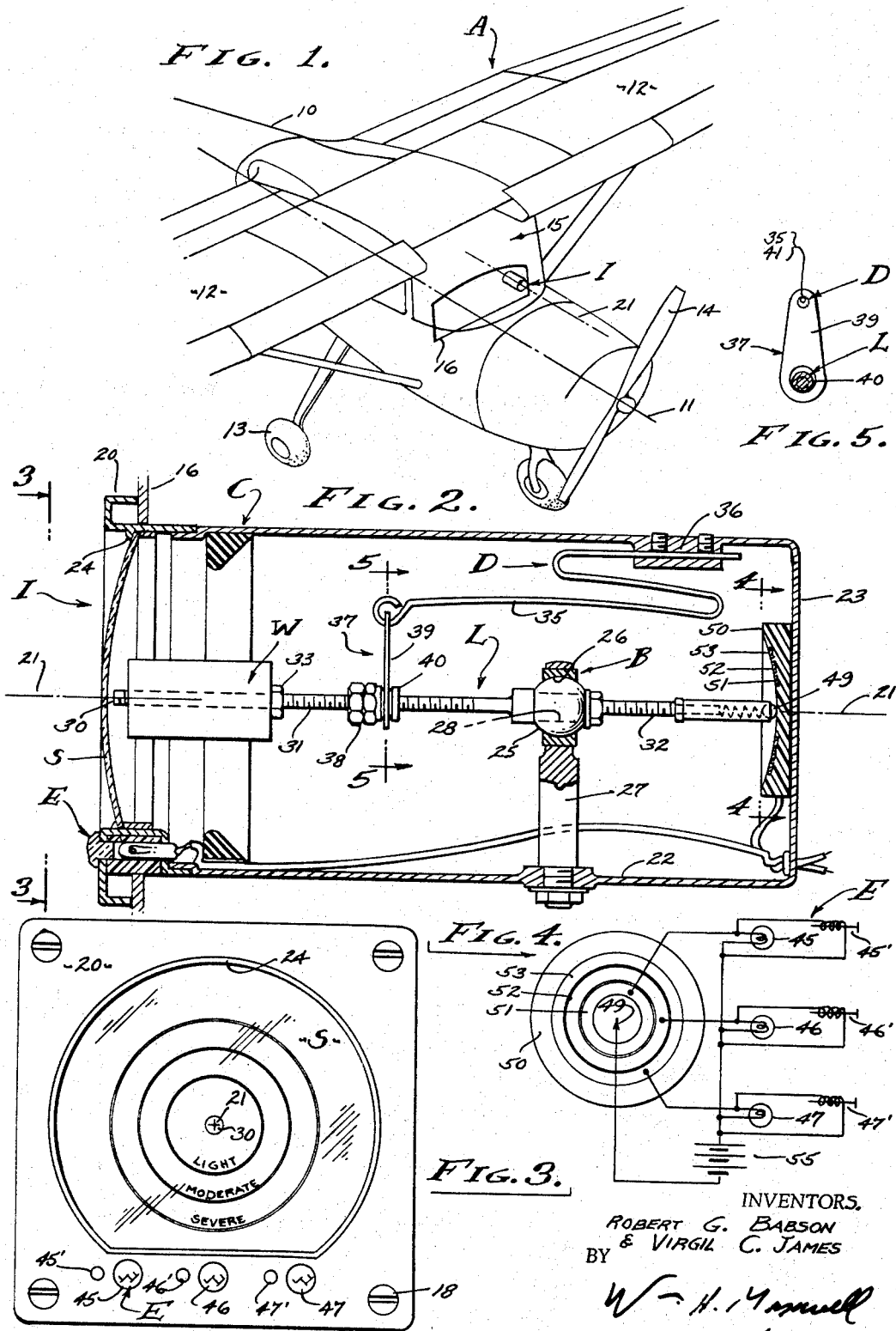

3,407,668
TURBULENCE INDICATOR FOR AIRCRAFT
Robert G. Babson, 16636 Pequeno Place, Pacific Palisades, Calif. 90272, and Virgil C. James, 22239 Ave. San Luis, Woodland Hills, Calif. 91364
Filed Apr. 28, 1965, Ser. No. 451,522
4 Claims. (Cl. 73—517)

ABSTRACT OF THE DISCLOSURE

An instrument is provided that establishes a continuous display to advise and warn a pilot, of aircraft and the like, of the intensity of lateral inertial displacements encountered. The instrument indication is continuously and presently visible at all times and such that the magnitude and direction is instantly discernable. The visible readout is, for example, disclosed as a three light and/or three zone warning system, whereby lateral displacements as caused by turbulence and like forces can be observed as "light," "moderate" and "severe."

---

This invention has to do with a warning device for vehicles to indicate conditions which cannot be accurately determined by human sensory perception alone, and relates to vehicular motion and especially with regard to air borne vehicles that are subjected to surrounding but unseeable atmospheric conditions referred to generally as turbulence.

Although this invention relates broadly to any and all structures subject to motion, it is particularly concerned with aircraft that operate along a line or axis of flight at rather high rates of speed. From a physical viewpoint the air-frame and its occupants are normally subjected to gentle rolls and yawing motions which are comprised of various combinations of displacements from the line or axis of flight as caused by air or wind pressures imposed against the air-frame. Obviously, such air and/or wind pressures are ordinarily invisible, and it is only storms and the like which are visible as clouds which can be seen. Although the density of the atmosphere remains substantially constant and because of the air-frame streamlining, fore and aft inertial changes are not a critical matter. However, inertial changes imposed in directions laterally of the line or axis of flight are critical and especially from a physical viewpoint related to both the air-frame and its occupants. Therefore, it is a general object of this invention to provide an indicating device which warns a pilot and/or any air-frame inspector that a certain intensity of lateral inertial displacement has been encountered.

An object of this invention is to provide an instrument for installation in the structure of a vehicle, and particularly in an air-frame, for visibly indicating and/or recording inertial displacement laterally from the normal direction of motion. With the invention, an instrument is provided for installation at any suitable location in the vehicle and preferably at or near critical positions. However, the visible read-out of the instrument can be placed as circumstances require, to best advantage, to be within the view of the pilot or operating crew.

Another object of this invention is to provide an instrument wherein the action thereof can be observed directly with a consequent determination of action, and an instrument wherein the action thereof can be remote. In either instance the action of the instrument is responsive to lateral displacement universally about the line or axis of forward motion (or reverse) and observation of the instrument indicates to the observer the presence of lateral inertial displacements and the direction in which they occur.

It is still another object of this invention to provide an instrument of the character thus far referred to which is in the nature of a warning device and which need not be attended to on a continuous basis, but which operates as an alarm which calls abnormal conditions to attention and after which function a discriminating observation can proceed for the determination of tactics to follow. For example, a three light system is hereinafter disclosed whereby "light," "moderate" and "severe" turbulence is indicated; a green light showing that "light turbulence" exists in which case seat belts should be fastened by the occupants; an amber light showing that "moderate turbulence" exists in which case turbulence penetration procedures should be followed, as for example procedures involving controlled speeds and propulsion safety requirements; and a red light showing that "severe turbulence" exists in which case evasive action should be initiated, for example a directional change leading to less turbulent areas.

It is also an object of this invention to provide an instrument for producing those showings as set forth above and which can be intelligently interpreted by a pilot, or crew, so that the presence of turbulence is not only called to attention but so that the increase or decrease of turbulence can be anticipated. With the instrument hereinafter disclosed the current and prevailing conditions are displayed as related to a standard which is readily built into the instrument, and human experience alone need not be relied upon. Further, it is also an object to preserve as recorded data the intensities arrived at by the instrument, and to this end one or more memory means is provided in order to retain this data.

The various objects and features of this invention will be fully understood from the following detailed description of the typical preferred form and application thereof, throughout which description reference is made to the accompanying drawings, in which:

FIG. 1 is a perspective view showing the installation of the indicator in an aircraft. FIG. 2 is an enlarged longitudinal sectional view of the indicator shown in FIG. 1. FIG. 3 is a front view of the indicator taken as indicated by line 3—3 on FIG. 2. FIG. 4 is a structural and partially diagrammatic view taken as indicated by line 4—4 on FIG. 2, and FIG. 5 is a detailed view taken as indicated by line 5—5 on FIG. 2.

The turbulence indicator of the present invention is intended primarily for aircraft use but may be used in other vehicles subject to similar motions. However, in aircraft a critical factor is the amount of stress applied as related to structure. That is, stresses are important in the maintenance of air-frame structures and it is not uncommon for aircraft to became uncontrollable and/or to fail due to the application of overstress at some unknown time. Thus, defects due to overstress become hindsight after failure takes place, and very often such failure takes place under normal conditions. To this end, therefore, the present invention provides an instrument which not only functions to indicate intensity of turbulence but which alarms those persons involved so that precautionary procedures can be instituted which will assure proper control of the aircraft and prevent structural damage thereto. Furthermore, the comfort of the occupants is to be considered and so that confidence is maintained, directed toward the pilot and operating crew. By following the data indicated by this instrument abnormal and violent lateral motions are brought to attention as they augment in intensity, or diminish, and in the event that a sudden and unexpected motion is encountered the degree thereof is brought to attention and/or recorded so that the pilot can act accordingly as prudence dictates.

A typical vehicle or aircraft A is shown and which can be a large commercial craft or even a light plane. In any case, the usual aircraft A has a fuselage 10 of elongate form disposed along the line or axis 11 of flight. The aircraft is supported by wings 12 when in flight and is supported by landing gear 13 when on the ground. A propeller 14 is driven by an engine at the forward end of the fuselage, there being a cabin 15 for housing the occupants beneath the wings and aft of the engine. The foregoing is general since the aircraft can vary so widely, the particular aircraft shown being basic and the portions thereof shown being reduced to bare minimum. As is illustrated, the cabin 15 has an instrument panel 16 therein and which is mounted to the structure to extend across the front of the cabin in a vertical plane, as is the usual case. It is on or in this panel 16 that the turbulence indicator of the present invention is installed in such an aircraft. Furthermore, in such an aircraft the instrument panel 16 is usually uncrowded in which case the addition of an instrument thereto is practical. However, in cases where the instrument panel is crowded then this instrument as such can be installed remote from the panel 16 and only the visually perceptable lights thereof are installed where the pilot can see them, as for example on said panel 16.

In the preferred form of the invention the instrument I is a single and self-contained unit shaped and proportioned for installation in an instrument panel 16. And it comprises generally, a case C, a bearing B, a lever L a weight W, balance means D and indicator means E. The case C contains and supports the parts and elements that are involved, the lever L and weight W presenting the movable or active parts which are carried by the bearing B within said case. The instrument I as a unit, is disposed in a predetermined orientation with relation to the aircraft A and line of flight or axis 11 and the balance means D is operative in the case C to hold the active parts in equilibrium at a null position. The indicator means E is operative to show the alarm or the like and by its visible action any displacement of the aircraft A from the normal line of flight of the axis 11.

The case S that contains and supports the elements of the instrument I is an elongate tubular housing of the usual proportion and size, compared with other instruments usually installed in an aircraft panel of the type under consideration. The frame 20 which is visible at the front of the panel 16 is substantially square with a mounting fastener 18 at each corner. Extending forwardly from the frame 20 and on a normally horizontal axis 21 is a tubular wall 22 that is closed at its forward end 23. In accordance with the invention the frame 20 has a sizeable aperture 24 therethrough and substantially the same size as the total cross section of the tubular wall portion of the case. Said opening 24 accommodates a screen S which is scribed and/or calibrated as later described. In accordance with the invention the axis 21 is aligned with the axis 11 above described, and said axis 21 is at least substantially parallel to the said axis 11.

The bearing B that is provided to carry the active parts, lever L and weight W, can vary as required and is essentially a swivel that permits universal movement of the lever L carrying the weight W. For example, a gimbal mechanism can be employed for this bearing B, like those universally employed in the support of magnetic navigating compasses or in the support of gyroscope elements and the like. However, a high quality and precision self-aligning bearing of the type shown in the drawings is adequate for the purpose intended. Such a bearing B, comprises an accurately ground steel ball 25 captured in a spherical antifriction race 26 as shown. The race 26 is truncated on two planes spaced equally from a vertically extended supporting axis or rod 27. Said truncated planes extend transversely of the case C so that the bearing ball 25 has access in a direction disposed longitudinally of said case. The ball 25 is provided with a bearing opening 28 which is adapted to receive and carry the lever L.

The lever L and weight W together comprise the principal active parts of the instrument I, being the structural and inertial elements respectively. In accordance with the invention the lever L is swivelly supported by the bearing B to swing universally from a center located on the axis 21, and in the case illustrated the said center is coincidental with the center of the ball 25 and race 26. The lever extends rearwardly and terminates at an end face 30 adjacent to the screen S, in which case the screen S is a portion of a sphere formed concentric with the pivotal center of the bearing. Further, when there is an indicating means E, we prefer to construct the lever L with two arms, one arm 31 extending rearwardly as above described and a second arm 32 extending forwardly. Thus, there is a pair of oppositely projecting and diametrically extending arms passing through the central pivot of bearing B and comprising a rigid lever L, whereby the motion of one arm is identically reflected in the motion of the other arm, and regardless of lengths which is compensated for as shown. The arm 32 is shown considerably shorter than the arm 31, said arm 32 carrying a contact part of the means E later described.

The weight W can vary in mass depending upon the action desired in relation to the mass of and violence of movement to which the aircraft A is likely to be subjected. It is to be understood that factors are involved which are related to aircraft control and stress capabilities and which vary in different air-frames. Therefore, the mass value of weight W will necessarily vary as circumstances require. In any case, however, the weight W is incorporated in the lever L and is preferably a body adjustably carried at the end portion of the lever L at or adjacent the screen S. In practice, the lever L has a threaded end portion onto which the weight W is screwed and held in place by a lock nut 33. With the parts thus far described it will be seen that the lever L and its arms 31 and 32 are capable of being disposed in a normal and null position aligned on the axis 21 and parallel to the axis 11 which is the line of flight.

The balance means D that is provided to hold the parts L and W in equilibrium at a null position is suspension means that yieldingly supports the lever L and weight W. The usual attitude of the aircraft A is erect with the platform thereof disposed horizontally and with gravitation pull disposed at a normal angle through the plane of the platform, and in the course of properly executed turns and other maneuvers the compounded forces that result remain disposed normally through said platform. Therefore, the means D can be simplified as shown and in the form of a spring means that supports the movable mass at a null position and so that movement of the mass is restricted in all lateral directions radiating from the axis 21.

In practice, the face 30 is the logical element to be observed and is coated with a distinguishable material such as luminescent paint, and it is this end face 30 which can be observed as it moves from the null position. To this end the screen S is made of translucent and preferably transparent material scribed with concentric circles, or similar forms, each representing degrees of displacement surrounding the null point placed at the center of the screen and aligned with the axis 21. It will be apparent that the exact shape of said concentric circles can vary as a means of calibrating to the characteristics of the spring support which comprises the means D.

The means D involves an elongate spring member 35 anchored in the case C at 36 and coupled to the arm 31 of lever L at 37. The spring member 35 is placed directly above the axis 21 and is disposed so as to substantially parallel said axis. The coupling point is intermediate the bearing B and weight W and is adjustably gained by employing a nut 38 that threads onto the threaded arm 31. A link 39 joins the nut to the spring member 35, engaging with a collar 40 rotatable on the nut and engaging with a hook or eye 41 at the terminal free end of the member 35. The anchor at 36 is rigid and effectively cantilevers the member 35 so that its terminal end is capable of deflection laterally in all directions. That is, gravitational pull will bend the member 35 downwardly while relaxation of gravitational pull will unbend the member 35 upwardly, and the imposition of lateral forces will bend the member laterally. It will be apparent that the application of lateral forces are combined in one movement as related to the spring member 35. In all instances the bending or unbending of the member 35 is lateral relative to the axis 21 and 11 and to the end that the face 30 can be observed to progress relative to the markings on the screen S. The effective length of the spring member 35 is increased, as illustrated by forming the same with an overlapped configuration.

The indicating means E that is provided primarily as a warning means is preferably a visual device that catches the eye of the pilot or crew. Keeping in mind that a pilot's console is complex and that the pilot cannot be expected to be attentive to this one instrument, a variable light means is employed and preferably utilizing three colored lights, for instance green, amber and red that are associated with "light," "moderate" and "severe" turbulence, respectively. To this end there are three lights 45, 46 and 47 housed for observation in the frame 20 and each lighted by a predetermined magnitude of movement of the lever L in any lateral direction. As shown, the lever arm 32 is employed for this purpose in which case there is a commutator 50 of concaved semi-spherical configuration and a brush 49 carried by the arm 32 and engageable with said commutator. In its simplest form the commutator 50 has concentric bands of conductive material 51, 52, and 53, of the same configuration as determined for the above described markings on screen S. The said bands are insulated one from the other and each is concentric with the axis 21.

The indicating means E involves an electrical power supply 55 with a circuit extending through the brush 49 and continuing through any one of the commutator bands 51, 52 and 53 to the respective lights 45, 46 and 47. For permanent indication there are corresponding solenoids 45', 46' and 47' and each with a plunger that will move when energized to be frictionally held in a visible position. Thus, for example, a record of indication is feasible.

From the foregoing it will be apparent that the instrument I is simple and capable of being constructed in a durable manner. The magnitude of lateral displacements from the line of flight or axis 11 is identically reflected in the displacement of the weight W from the axis 21. The magnitude of said deflection is then operative to energize a visible indicator light which attracts the eye of the pilot or crew, the color of which impresses an image upon the eye of the observer and to the end that the degree of displacement is immediately known according to the predetermined limits of the instrument. As set forth at the outset of this specification, appropriate action is then taken.

Having described only a typical preferred form and application of our invention, we do not wish to be limited or restricted to the specific details herein set forth, but wish to reserve to ourselves any modifications or variations that may appear to those skilled in the art.

Having described our invention, we claim:

1. An instrument for indicating lateral displacements from the longitudinal line of movement of a vehicle and including:
   (a) a lever disposed on a null axis parallel to the longitudinal line of movement of the vehicle;
   (b) bearing means universally pivoting one end of the lever to a part of the vehicle;
   (c) a weight carried at the other end of the lever and having a visible center end face;
   (d) a spring member anchored to said part of the vehicle and disposed above the lever and parallel therewith and coupled to the lever by universal connecting means attached to the end of the spring member and yieldingly suspending the weight on said null axis;
   (e) and a transparent screen adjacent to the free and other end of the lever exposing the end face to continued view and having incrementally sized concentric markings to which the magnitude of movement of the weight as viewed by said end face is comparable and namely the lateral displacement thereof from said null axis.

2. An instrument for indicating lateral displacement from the longitudinal line of movement of a vehicle and including:
   (a) a lever disposed on a null axis parallel to the longitudinal line of movement of the vehicle;
   (b) bearing means universally pivoting one end of the lever to a part of the vehicle;
   (c) a weight carried at the other end of the lever;
   (d) a spring member anchored to said part of the vehicle and disposed above the lever and parallel therewith and coupled to the lever by universal connecting means attached to the end of the spring member and yieldingly suspending the weight on said null axis;
   (e) and means showing movement of the weight and namely the lateral displacement thereof from the said null axis.

3. An instrument for indicating lateral displacements from the longitudinal line of movement of a vehicle and including:
   (a) a lever disposed on a null axis parallel to the longitudinal line of movement of the vehicle;
   (b) bearing means universally pivoting one end of the lever to a part of the vehicle;
   (c) a weight carried at the other end of the lever;
   (d) a spring member anchored to said part of the vehicle and disposed above the lever and parallel therewith and coupled to the lever by a link swivelled on the lever and hooked to the end of the spring member to yieldingly suspend the weight on said null axis;
   (e) and means showing movement of the weight and namely the lateral displacement thereof from the said null axis.

4. An instrument for indicating lateral displacements from the longitudinal line of movement of a vehicle and including:
   (a) a tubular case for installation on a fixed part of the vehicle and disposed on an axis parallel to the longitudinal line of movement of the vehicle;
   (b) a lever disposed in a null position on the axis of the case;
   (c) bearing means supported by and within the case and universally pivoting one end of the lever;
   (d) a yieldingly suspended weight carried at the other end of the lever and having a visible center end face;
   (e) a spring member anchored to said part of the vehicle and disposed above the lever and parallel therewith and coupled to the lever by a link swivelled on the lever and hooked to the end of the spring member to yieldingly suspend the weight on said null axis;
   (f) and a transparent screen at the end of the case and adjacent to the free and other end of the lever exposing the end face to continued view and having incrementally sized concentric markings to which the magnitude of movement of the weight as viewed by said end face is comparable and namely the lateral displacement thereof from said null axis.

References Cited

UNITED STATES PATENTS 2,232,360   2/1941   Barnett.

(Other references on following page)

| | | | |
|---|---|---|---|
| 2,386,777 | 10/1945 | Bentley | 73—514 XR |
| 2,538,303 | 1/1951 | Findley | 73—505 XR |
| 2,665,896 | 1/1954 | Kirby et al. | 73—516 XR |
| 2,881,276 | 4/1959 | Mintz et al. | 73—514 XR |
| 2,933,820 | 4/1960 | Bobo et al. | 33—206.5 XR |
| 2,964,948 | 12/1960 | La Coste | 73—516 XR |
| 3,183,321 | 5/1965 | Miller | 73—492 XR |
| 3,183,512 | 5/1965 | Castle | 346—7 |
| 2,385,424 | 9/1945 | Shue et al. | |

FOREIGN PATENTS

| | | |
|---|---|---|
| 40,353 | 1957 | Poland. |
| 182,540 | 6/1922 | Great Britain. |

OTHER REFERENCES

An article from "Control Engineering," pp. 105–6, vol. 12, No. 3, March 1965, entitled "Accelerometer Scribes Vector Force Signature," by A. Castle.

JAMES J. GILL, *Primary Examiner.*